United States Patent
Devageorge et al.

(10) Patent No.: US 11,860,963 B2
(45) Date of Patent: *Jan. 2, 2024

(54) ENHANCED METHODS AND SYSTEMS FOR AUTOMATED SKILL GENERATION AND MANAGEMENT

(71) Applicant: Zoho Corporation Private Limited, Kanchipuram District (IN)

(72) Inventors: Jeri John Prabhu Devageorge, Kanyakumari (IN); Manikandan Vembu, Chennai (IN); Vijayakrishna Poisolla Meiyan, Tirunelveli (IN)

(73) Assignee: Zoho Corporation Private Limited, Kanchipuram (IN)

(*) Notice: Subject to any disclaimer, the term of this patent is extended or adjusted under 35 U.S.C. 154(b) by 0 days.

This patent is subject to a terminal disclaimer.

(21) Appl. No.: 17/692,593

(22) Filed: Mar. 11, 2022

(65) Prior Publication Data

US 2022/0197965 A1    Jun. 23, 2022

Related U.S. Application Data

(63) Continuation of application No. 16/243,889, filed on Jan. 9, 2019, now Pat. No. 11,294,975.

(Continued)

(51) Int. Cl.
*G06F 17/00* (2019.01)
*G06F 16/9535* (2019.01)

(Continued)

(52) U.S. Cl.
CPC ...... *G06F 16/9535* (2019.01); *G06F 16/9566* (2019.01); *G10L 15/1822* (2013.01);

(Continued)

(58) Field of Classification Search
CPC ............ G06F 16/9535; G06F 16/9566; G06F 16/632; G06F 16/9532; G06F 3/167;

(Continued)

(56) References Cited

U.S. PATENT DOCUMENTS 6,643,621 B1    11/2003   Dodrill
7,822,612 B1    10/2010   Goodheart (Continued)

OTHER PUBLICATIONS

Brian Barrett, "Amazon Alexa Hits 10,000 Skills. Here Comes the Hard Part," www.wired.com, Feb. 23, 2017 (12 pages).

(Continued)

*Primary Examiner* — Greta L Robinson
(74) *Attorney, Agent, or Firm* — Silicon Edge Law Group LLP; Arthur J. Behiel

(57) ABSTRACT

Systems and methods for enhancing the functionality of client communication devices that may execute supported applications and are communicatively tied to the Internet are described. An automated procedure for generating new skills first finds forms on the Internet that require user interaction, then generates skills to support those interactions, and then uploads the new skills into a skills database. The skills acquired can make it easier for users to engage with associated web resources in the future, making it possible to support interactions that are partially or entirely speech-based.

17 Claims, 5 Drawing Sheets

Related U.S. Application Data

(60) Provisional application No. 62/615,887, filed on Jan. 10, 2018.

(51) Int. Cl.
*G06F 16/955* (2019.01)
*G10L 15/18* (2013.01)
*G10L 15/30* (2013.01)
*G10L 15/22* (2006.01)

(52) U.S. Cl.
CPC .............. *G10L 15/22* (2013.01); *G10L 15/30* (2013.01); *G10L 2015/223* (2013.01)

(58) Field of Classification Search
CPC ..... G10L 15/1822; G10L 15/22; G10L 15/30; G10L 2015/223
See application file for complete search history.

(56) References Cited

U.S. PATENT DOCUMENTS

| | | | | |
|---|---|---|---|---|
| 9,984,686 | B1* | 5/2018 | Mutagi | G10L 15/26 |
| 10,609,221 | B2* | 3/2020 | Tobin | H04M 3/527 |
| 11,037,565 | B2* | 6/2021 | Kudurshian | G10L 15/22 |
| 11,294,975 | B1* | 4/2022 | Devageorge | G10L 15/30 |
| 2011/0087647 | A1 | 4/2011 | Signorini | |
| 2011/0301943 | A1 | 12/2011 | Patch | |
| 2011/0307484 | A1 | 12/2011 | Anand | |
| 2013/0246050 | A1 | 9/2013 | Yu | |
| 2018/0007201 | A1 | 1/2018 | Kurganov | |
| 2018/0321905 | A1 | 11/2018 | Fountaine | |
| 2018/0330069 | A1 | 11/2018 | Quinn et al. | |
| 2019/0013018 | A1 | 1/2019 | Rekstad | |
| 2019/0108834 | A1 | 4/2019 | Nelson | |
| 2019/0180343 | A1 | 6/2019 | Arnett et al. | |

OTHER PUBLICATIONS

Fillr, "Autofill for Chrome by Fillr," Chrome Web Store, accessed Dec. 18, 2018, (5 pages).

Jiepu Jiang, Ahmed Hassan Awadallah, Rosie Jones, Umut Ozertem, Imed Zitouni, Ranjitha Gurunath Kulkarni, and Omar Zia u Khan, Automatic Online Evaluation of Intelligent Assistants, In Proceedings of the 24th International Conference on World Wide Web, Inter WWW Conf. Steering Committee, pp. 506-516, May (Year: 2015) (11 pages).

Adam Di Prospero, Nojan Norouzi, Marios Fokaefs, and Marin Litoiu. Chatbots as assistants: an architectural framework. In Proceedings of the 27th Annual International Conference on Computer Science and Software Engineering , IBM Corp., 76-86, Nov. (Year: 2017) (11 pages).

David Sherfesee and Niall O'Driscoll. A web mining research platform. In Proceedings of the 28th annual international ACM SIGIR conference on Research and development in information retrieval, Association for Computing Machinery, p. 682, August (Year:2005) (1 page).

M. Mehrabani, S. Bangalore and B. Stern, "Personalized speech recognition for Internet of Things," 2015 IEEE 2nd World Forum on Internet of Things (WF-IoT), 2015, pp. 369-37 4, doi: 10.1109/WF-IoT.2015.7389082. Dec. (Year: 2015) (6 pages).

\* cited by examiner

ENHANCED METHODS AND SYSTEMS FOR AUTOMATED SKILL GENERATION AND MANAGEMENT

BACKGROUND

A "skill" is a device capability. Amazon's ALEXA, a so-called intelligent personal assistant capable of voice interaction, provides examples in which a user can enable and disable skills, using the ALEXA application (app) or a web browser, as one would install and remove apps on a mobile device. Skills can be called up using manual user-interface (UI) devices, such as a keyboard or mouse, or can be called up using voice commands. People and institutions are rapidly developing skills for accomplishing myriad tasks. There nevertheless remains a demand for skill development.

BRIEF DESCRIPTION OF THE DRAWINGS

The subject matter presented herein is illustrated by way of example and not by way of limitation in the figures of the accompanying drawings, in which like reference numerals refer to similar elements and in which.

DETAILED DESCRIPTION

Figure 1:
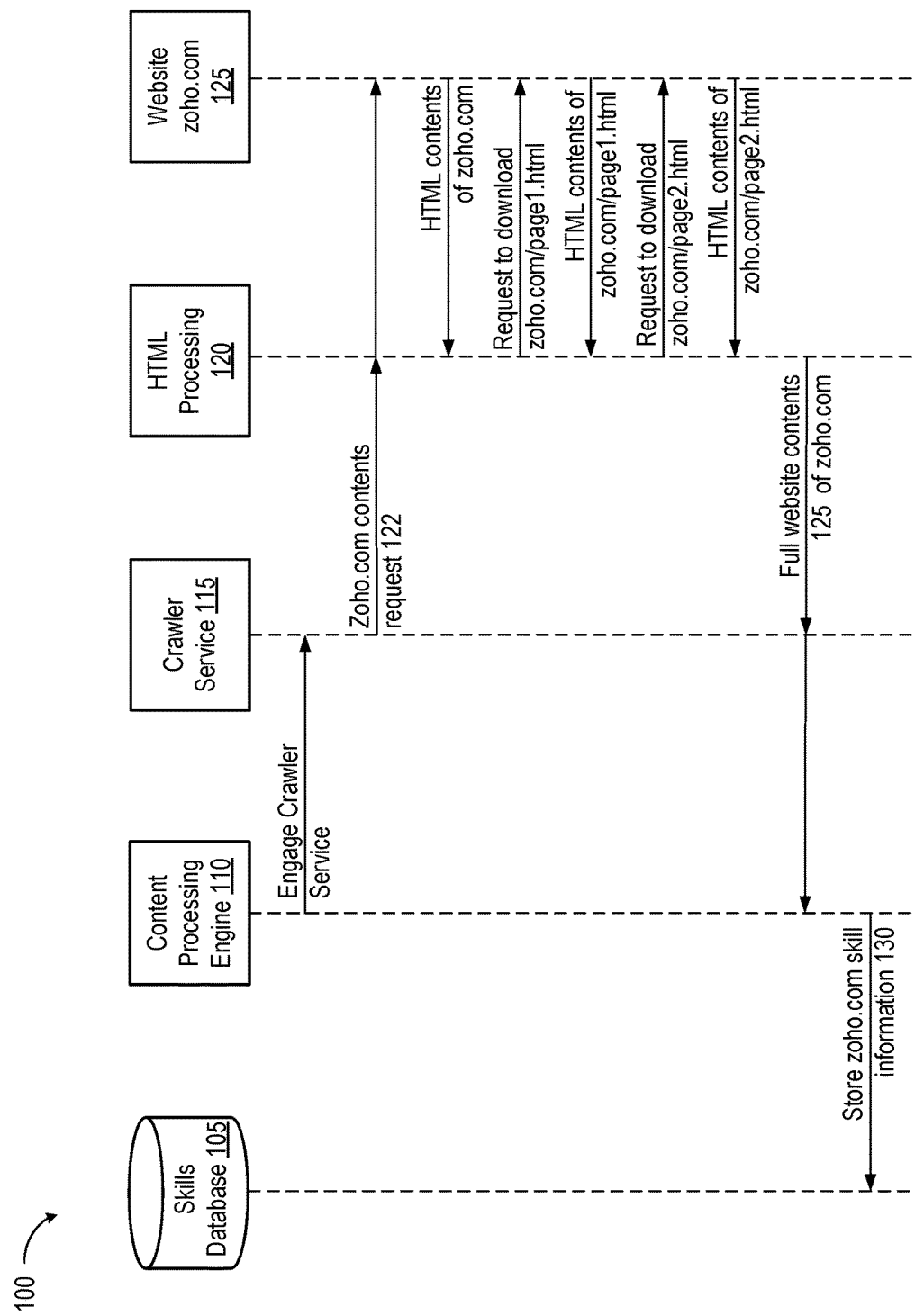
FIG. 1 diagrammatically depicts information flow 100 in support of systems and methods for extending the capabilities of client communication devices that are communicatively coupled to the Internet and capable of executing supported applications.

FIG. 1 diagrammatically depicts information flow 100 in support of systems and methods for extending the capabilities of client communication devices that are communicatively coupled to the Internet and capable of executing supported applications. The information flow is automated to locate information resources on the World Wide Web ("web resources") that require user interaction, develop skills in support of those interactions, and load the skills into a skills database 105. The skills thus developed and stored can simplify subsequent user interactions with the related web resources, such as to facilitate interactions that are partially or wholly based on speech. For example, an automated skills-creation system might comb the web to identify web forms associated with banking websites and develop the requisite skills for interacting with those resources to e.g. open accounts, check balances, and transfer money. Rather than conventionally interacting with the corresponding bank by filling in various form fields using a mouse and keyboard, as intended by the designer of the web interface, a related "skill" in database 105 might walk the user through the account process as would a human teller, receiving the requisite form data via verbal communication converted to ASCII. Skills development of this kind can expand to support interaction with a nearly unlimited number of service providers. The resultant ease of use would be a boon for mobile-device users.

Information flow 100 relies on components that can be supported by different economic entities (e.g., one or more cloud-based service providers interconnected via the Internet). A content-processing engine 110 engages a crawler service 115 to automatically crawl the World Wide Web in a methodical, automated manner to discover web forms in need of skills. Engine 110 can select specific types of resources, such as to emphasize popular skills types and reduce risks associated with malicious websites. Where engine 110 has access to browsing histories, engine 110 can target skill creation by popularity rather than or in addition to via crawling. The latter is advantageous, however, in that skills can be created in advance of user access.

Crawler service 115 employs an HTML processor 120 running a headless browser (a web browser without a graphical user interface) to access web resources via their uniform resource locators (URLs), issuing a request 122 to download the contents of a website 125 (e.g. zoho.com). Processor 120 responsively downloads the contents of zoho.com, e.g. two pages page1.html and page2.html, and relays the full website contents to crawler service 115, which in turn relays the contents 125 to content-processing engine 110.

Engine 110 parses the HTML data from the selected web resource, such as a web form or forms on pages page1.html and page2.html, and attempts to exercise form links and fields. A web form allows users to enter data to send to a server for processing. Web forms can resemble paper or database forms because web users fill out the forms using e.g. check boxes, radio buttons, or text fields.

In this example, engine 110 runs an automated skill-builder that parses a sign-up form on page page1.html for an online account for data inputs and builds a skill that gathers the requisite data. The form may simply require a name and a password or may require more information that can be gathered from various resources. For example, a skill to open an account with a particular service provider might gather user data from the user, the user's device, and an accessible database. The skill might also ask for or suggest a password, arrange for the transfer of money, etc. Skills may also be independent of service providers. A hotel-reservations skill called up by a user seeking a place to stay may be capable of interacting with multiple hotel websites, selecting among them based on location, cost, user preferences, etc. Once developed, a user could execute the skill by interrogating an entity with access to content processing engine 110. Engine 110 could add, remove, or update skills responsive to information obtained by periodically crawling the Web for web forms. Engine 110 represents each skill it creates or builds as a set of instructions and data required to execute the skill and stores this skill information 130 in skills database 105.

Figure 2:
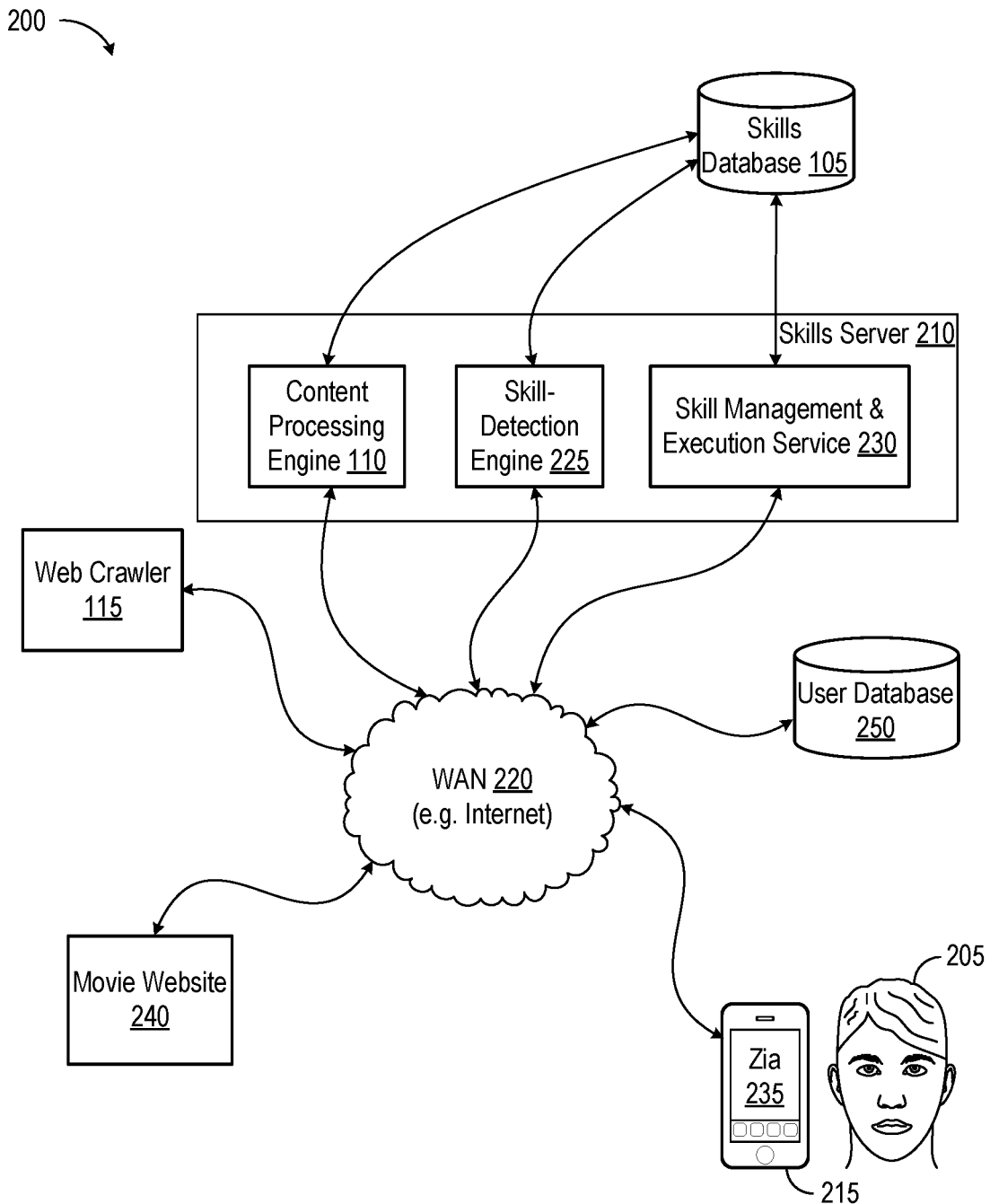
FIG. 2 depicts a networked communication system 200 that allows a user 205 access to a skills server 210 via a remote device 215 and a wide-area network 220, such as the Internet.

FIG. 2 depicts a networked communication system 200 that allows a user 205 access to a skills server 210 via a remote device 215 and a wide-area network 220, such as the Internet. Skills server 210 has or has access to skills database 105 and includes content-processing engine 110 as detailed above in connection with FIG. 1. Skills server 210 additionally supports or includes a skill-detection engine 225 and a skill management-and-execution service 230. Device 215, a mobile phone in this example, can be other types of client devices that support a voice user interface and have access to networked resources.

Skills database 105 stores skills associated with many web resources, including a skill to access an online bank account with a movie website 240. User 205 can browse website 240 manually using device 215; however, such browsing requires manual device access that can be inconvenient. User 205 can instead initiate a call to skill server 210 using a voice command or chat interface to a skill application (app) 235 running on device 215. Calls to skill app 235 are initiated using a leading term "Zia" in this example. User 205 might ask "Zia, open an account on the movie website" or "Zia, play a movie from the movie website." Skill-detection engine 225 responsively checks skills database 105 for the requested skill. Should the skill exist, skill management and execution server 230 downloads the skill from database 105, gathers the requisite information, and performs the skill on behalf of user 205. The requisite information may be acquired from a user database 250, device 235, user 205, the resource of interest, or a combination of these and other information sources. For example, if the user's request is to watch a movie the skill might create or log into the website of the requested resource, elicit a genre or title, process payment, and direct the movie to a browser on device 235. If the use's request is to attend a movie, execution server might additionally present user 205 with show times and locations.

Where device 215 support apps with overlapping capabilities, skills can aid in app selection. For example, user 205 issues a voice command to the Zia app 235 to "get directions to Pleasanton California" on a device that has or has access to multiple apps capable of answering the user's request. Skill server 210 aids in selecting which app or apps have the requested skill, if any, and to select between suitable apps if there is more than one. Skill server 210 can query e.g. database 250 for information relating supported applications to capabilities of computing device 215 to match at least one of the applications supported by device 215 to the expressed device capability parsed from the command.

App selection based on capability can be accomplished on or aided by information stored by or from device 215. Selecting which apps to execute may be based on a user prompt, or may be based on some desired metric, such as a record of which app works better, receives higher reviews, was selected last time by the user, or which provider pays a small fee. Ambiguities between skill selections can also be resolved with reference to some characteristic of the user, such as location or various personal data stored in an accessible database. Skill server 210 can relate skills to teams, employees, categories, etc. External skills can be developed and customized for an organization. For example, an Uber skill might call a driver but also submit the requisite expense to the company. Such a skill could be internal or shared between companies.

Figure 3:
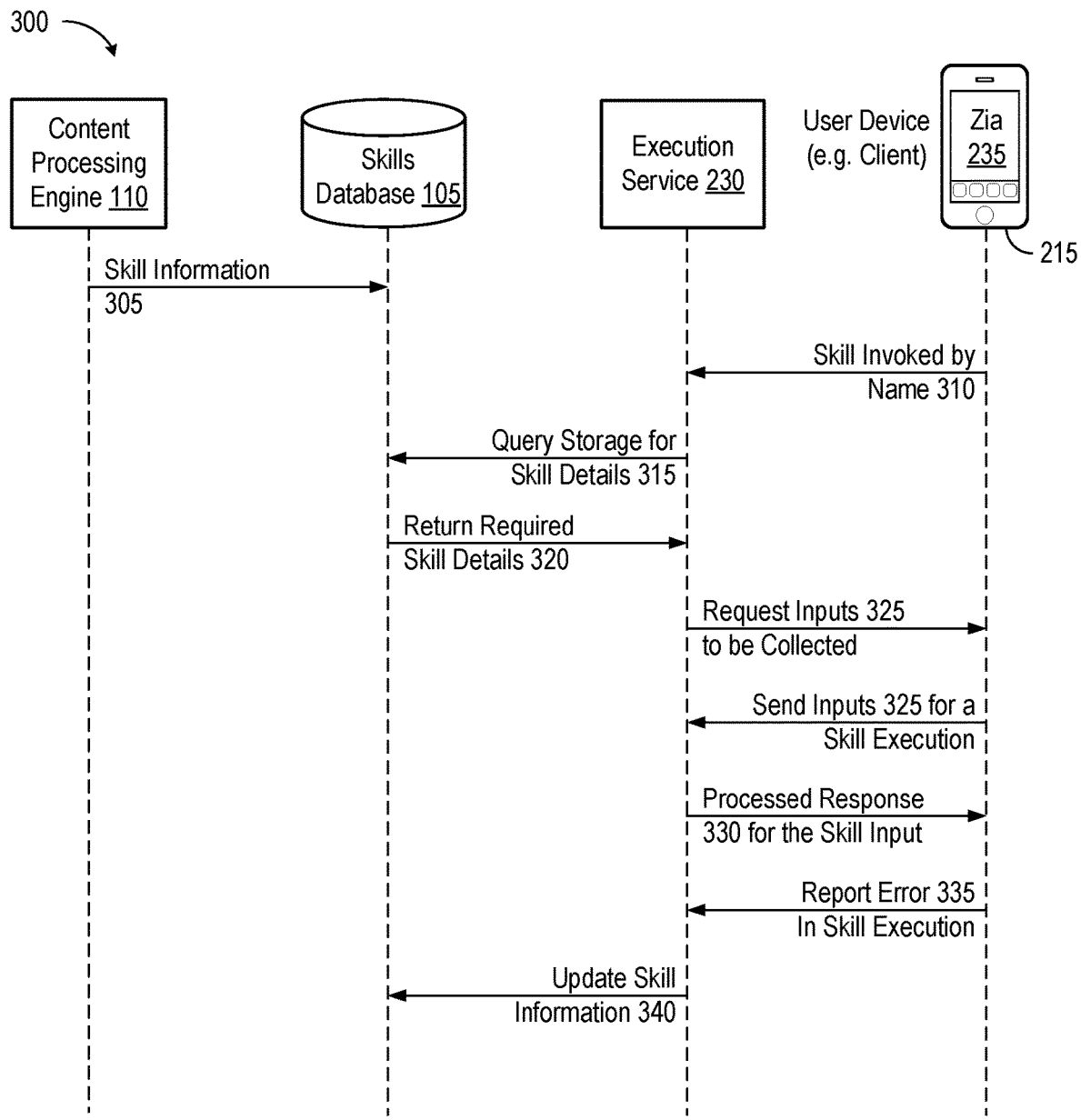
FIG. 3 diagrammatically depicts information flow 300 in support of invoking skills in accordance with one embodiment.

FIG. 3 diagrammatically depicts information flow 300 in support of invoking skills in accordance with one embodiment. As detailed previously, content processing engine 110 and other elements crawls the Internet for forms, automatically develops corresponding skills, and populates skills database 105 with skill information (305). A user employs device 215 to invoke a skill by name, typically via a voice command (310). Execution service 230 queries database 105 for stored details required for skill execution (315). In this example, those skill details 320 include inputs from device 215 that are required for skill execution, details such as the name and location of the user expressing interest in movie. Execution service 230 retrieves these details by requesting inputs 325 to be collected from the user or user's device 215. Service 230 can also collect skill information from third-party databases, such as show times and theater locations. Execution service 230 then awaits inputs 325 from device 215, and any other information required for skill execution, and returns a response 330 to device 215. In the movie example, response 330 might include an electronic movie ticket and receipt.

Execution service 230 can additionally update and maintain skills as needed for improved performance and ease of use. Service 230 may, for example, monitor the outcome of an executed skill and update the capability accordingly. The example of FIG. 3 includes an error message 335 from device 215. A movie theater targeted by the invoked skill may have modified their web interface to require additional user input from the time of skill creation, for example, in which case app 235 would report a failure to complete the skill. The user would suffer the minor inconvenience of being prompted for the missing input. Report 335 would allow execution service 230 to update the skill, possibly working with engine 110, to seek the requisite additional user input and pass updated skill information 340 to skills database 105. Subsequent users of the skill would thus be presented with an updated, corrected version. Skills may likewise be updated by content processing engine 110 periodically exercising skills via a test browser. Stale skills can be updated automatically or with human support.

Figure 4:
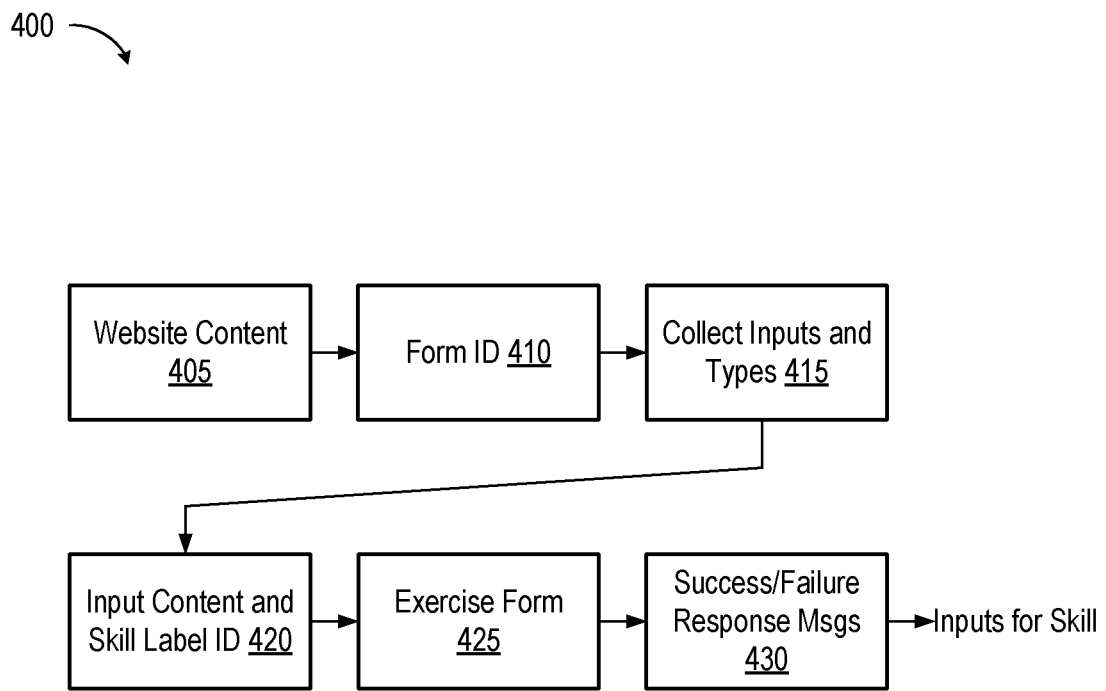
FIG. 4 is a flowchart 400 illustrating how content processing engine 110 builds skills with which to populate and update database 105 in accordance with one embodiment.

FIG. 4 is a flowchart 400 illustrating how content processing engine 110 builds skills with which to populate and update database 105 in accordance with one embodiment. This example assumes a single URL represented as a website 405 with form fields indicative of the possibility of building an applicable skill. Engine 110 assigns the skill a form identifier (ID) 410 and parses the page or pages to identify the requisite inputs and input types 415 (e.g., form fields, activatable icons, captchas).

Many forms and fields are sufficiently descriptive that users can fill in the requisite data (e.g., the "name" field is labeled "name"). Engine 110 executes an automated skill-builder process that parses such forms for the requisite information to develop a speech-based skill. The automated skill builder might be sufficiently generic that it could be applied to web forms generally. Alternatively, a relatively small set of skill builders tailored for different languages, business types, local norms, etc., could be used. In any case, one or an army of web crawlers (also known as web spiders or web robots) could automatically crawl the World Wide Web in a methodical, automated manner to discover web forms in need of skills, apply suitable available skills, and prompt human intervention where no suitable skill can be created.

Engine 110 can use actual or fictitious data to gather what input is available (e.g., the timing or location of a service) and derive a skill label (420). Engine 110 then exercises the form by generating questions and collecting simulated user responses (425). Simulated user responses can be taken from fictitious users during skill development. This step may seek human intervention, as where a captcha requires recognition. Engine 110 considers and addresses success/failure response messages (430) until the skill under development succeeds. Content-processing engine 110 then stores the newly created or updated skill with corresponding skill identifier in skills database 105.

The information flow detailed above in connection with FIGS. 1-4 is automated to locate web resources that require user interaction, develop skills in support of those interactions, and store the skills. The skills thus developed can dramatically simplify subsequent user interactions with the related web resources, such as to facilitate interactions that are partially or wholly based on speech.

Skills can be grouped by entity, skill category, or any combination of these and other logical connections. Skills can further be nested within other skills. A user might execute a skill to open a bank account that prompts the user to select a bank, and in so doing call up a second skill nested within the first. In the alternative, the entire nested structure could be considered a "bank" skill with individual-bank or branch sub-skills. A user could thus call up a bank skill ("Zia, help me open a bank account") that solicits location and other preference information from the user, selects a bank-specific skill accordingly, and steps the user through an account set-up process stylized and tested for the desired bank. A third-party service, such as available from Google, can perform the speech recognition required to convert voice commands to digital representations of the contents of those commands. Skill server 210 can note stumbling blocks and corrections to improve a skill based on user experience.

In some embodiments skill server 210 builds skills for a website visitor "on the fly," with the user's experience guiding skill creation. For example, the skill builder could note when skill creation stumbles or fails, noting steps the user takes to overcome problems. Failure could also be reported to a human to fix the skill. Multiple skills can also be provided for the same task to accommodate user differences. Skills for a given task can also evolve with changes in e.g. the content of an associated website or other variations in users or context.

The Zoho intelligent assistant (Zia) could maintain a large database of skills and device capabilities. The user might ask "Give me directions home," likely supported locally via a GPS app, or "Open me an account with Bank of America (BofA)," likely not supported locally because the user would not yet have a BofA app. The Zia app could check whether the BofA skill is available on the device, and if not check the Zia server to see whether such a skill is available at all, and if so to assist the user in opening the BofA account. The skill might require getting the requisite device support (e.g., downloading an app), if any, etc. The skill may exist in the cloud because (1) another Zia user developed the skill, (2) Zia developed the skill in connection with another user successfully opening a BofA account, (3) the skills crawler created the skill, or (4) a combination of these. The skills builder might also build the skill on the fly for the first requesting user and store a successful version of the skill for subsequent requests. This process is analogous to progressively better searches that flow from repeated queries and answers except that here the "answers" are activities rather than results.

Figure 5:
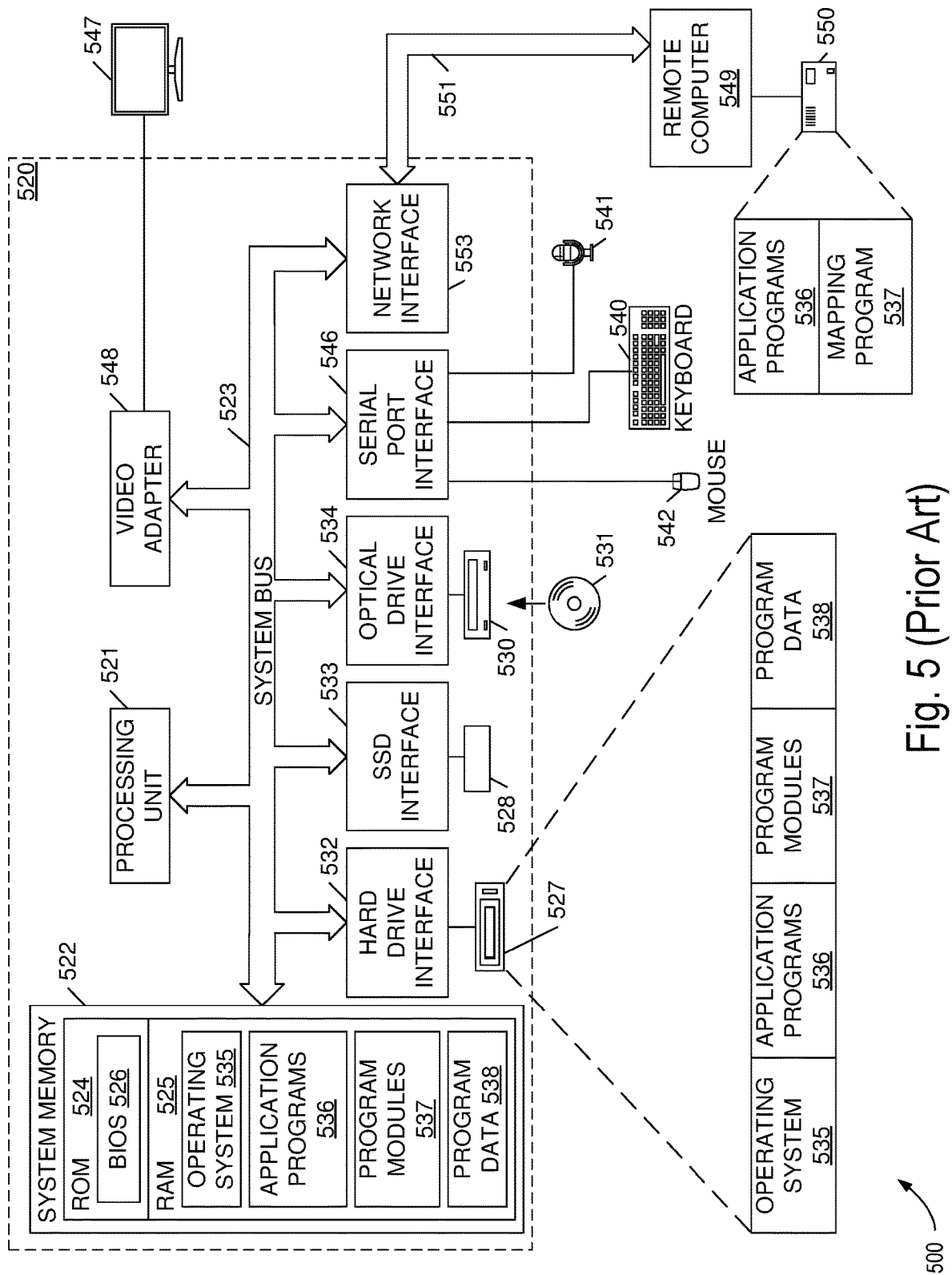
FIG. 5 (prior art) depicts a general-purpose computing system 500 that can serve as a client or a server depending on the program modules and components included.

FIG. 5 (prior art) depicts a general-purpose computing system 500 that can serve as a client or a server depending on the program modules and components included. One or more computers of the type depicted in computing system 500 can be configured to perform operations described with respect to FIGS. 1 through 4. Those skilled in the art will appreciate that the invention may be practiced using other system configurations, including hand-held devices, multi-processor systems, microprocessor-based or programmable consumer electronics, network PCs, minicomputers, mainframe computers, and the like.

Computing system 500 includes a conventional computer 520, including a processing unit 521, a system memory 522, and a system bus 523 that couples various system components including the system memory to the processing unit 521. The system bus 523 may be any of several types of bus structures, including a memory bus or memory controller, a peripheral bus, and a local bus using any of a variety of bus architectures. The system memory includes read only memory (ROM) 524 and random-access memory (RAM) 525. A basic input/output system 526 (BIOS), containing the basic routines that help to transfer information between elements within the computer 520, such as during start-up, is stored in ROM 524. The computer 520 further includes a hard disk drive 527 for reading from and writing to a hard disk, not shown, a solid-state drive 528 (e.g. NAND flash memory), and an optical disk drive 530 for reading from or writing to an optical disk 531 (e.g., a CD or DVD). The hard disk drive 527 and optical disk drive 530 are connected to the system bus 523 by a hard disk drive interface 532 and an optical drive interface 534, respectively. The drives and their associated computer-readable media provide nonvolatile storage of computer readable instructions, data structures, program modules and other data for computer 520. Other types of computer-readable media can be used.

A number of program modules may be stored on the hard disk, solid state disk 528, optical disk 531, ROM 524 or RAM 525, including an operating system 535, one or more application programs 536, other program modules 537, and program data 538. A user may enter commands and information into the computer 520 through input devices such as a keyboard 540, microphone 541, and pointing device 542. Other input devices (not shown) may include a microphone, joystick, game pad, satellite dish, scanner, or the like. These and other input devices are often connected to the processing unit 521 through a serial port interface 546 that is coupled to the system bus, but may be connected by other interfaces, such as a parallel port, game port or a universal serial bus (USB). A monitor 547 or other type of display device is also connected to the system bus 523 via an interface, such as a video adapter 548. In addition to the monitor, computers can include or be connected to other peripheral devices (not shown), such as speakers and printers.

The computer 520 may operate in a networked environment using logical connections to one or more remote computers, such as a remote computer 549. The remote computer 549 may be another computer, a server, a router, a network PC, a peer device or other common network node, and typically includes many or all of the elements described above relative to the computer 520, although only a memory storage device 550 has been illustrated in FIG. 5. The logical connections depicted in FIG. 5 include a network connection 551, which can support a local area network (LAN) and/or a wide area network (WAN). Such networking environments are commonplace in offices, enterprise-wide computer networks, intranets and the Internet.

Computer 520 includes a network interface 553 to communicate with remote computer 549 via network connection 551. In a networked environment, program modules depicted relative to the computer 520, or portions thereof, may be stored in the remote memory storage device. It will be appreciated that the network connections shown are exemplary and other means of establishing a communication link between the computers may be used.

Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. section 112(f).

What is claimed is:

1. A method for extending capabilities of a computing device communicatively coupled to the Internet and capable of executing a plurality of supported applications responsive to user inputs, the method comprising:
   maintaining a skills database of the capabilities;
   automatically browsing resources identified by universal resource locators (URLs); and
   for each of the URLs,
      parsing the resource identified by the URL for form-based user-interface elements seeking user input;
      creating skill information eliciting the user input;
      associating the skill information with the URL; and
      adding the skill information to the skills database.

2. The method of claim 1, further comprising:
   receiving a command at the computing device from a user;
   parsing the command for an expression of a skill;
   querying the skills database to match the expression of the skill to one of the capabilities; and
   executing the one of the capabilities matching the expression of the skill.

3. The method of claim 2, further comprising monitoring an outcome for the executed one of the capabilities and updating the one of the capabilities responsive to the outcome.

4. The method of claim 1, further comprising:
   receiving a voice command at the computing device from a user;
   converting the voice command to a digital representation of contents of the command;
   parsing the digital representation of the contents of the voice command for an expression of a skill;
   querying the skills database to match the expression of the skill to one of the capabilities; and
   executing the one of the capabilities matching the expression of the skill.

5. The method of claim 4, further comprising monitoring an outcome for the executed one of the capabilities and updating the one of the capabilities responsive to the outcome.

6. The method of claim 4, wherein converting the voice command to a digital representation of the contents of the command comprises transmitting the command to a third-party.

7. The method of claim 1, wherein the skills database relates devices to the capabilities.

8. A method for extending capabilities of a computing device communicatively coupled to the Internet and capable of executing a plurality of supported applications responsive to user inputs, the method comprising:
   maintaining a skills database of the capabilities;
   automatically browsing resources identified by universal resource locators (URLs); and
   for each of the URLs,
      downloading the resources identified by the URL;
      parsing the resource identified by the URL for form-based user-interface elements seeking user form input;
      creating skill information eliciting the user form input;
      associating the skill information with the URL; and
      adding the skill information to the skills database.

9. The method of claim 8, further comprising:
   receiving a command at the computing device for filling out a form, wherein the command is from a user, a user device or the skills database;
   parsing the command for an expression of a skill;
   querying the skills database to match the expression of the skill to one of the capabilities; and
   executing the one of the capabilities matching the expression of the skill.

10. The method of claim 9, further comprising monitoring an outcome for the executed one of the capabilities and updating the one of the capabilities responsive to the outcome, wherein the outcome indicates an error in the executing.

11. The method of claim 9, wherein the executed capabilities are selected based on a capability of the computing device.

12. A method for executing commands received via a computing device capable of executing a plurality of supported applications responsive to the commands, the method comprising:
   receiving a command at the computing device based on user form input;
   converting the command to a digital representation of contents of the command;
   parsing the digital representation of the contents of the command for an expression of a device capability;
   querying a database relating the supported applications to capabilities of the computing device to match at least one of the applications to the expressed device capability parsed from the digital representation of the contents of the command; and
   executing one of the at least one of the applications matched to the device capability.

13. The method of claim 12, wherein converting the command to a digital representation of the contents of the command comprises transmitting the command to a third-party.

14. The method of claim 12, wherein the database relates the device capability to multiple ones of the applications, the method further comprising selecting between multiple ones of the applications based on user preferences, user review, application performances or cost of the application.

15. The method of claim 14, wherein selecting between the multiple applications comprises querying the user for an application preference and receiving from the user an input of application preference.

16. The method of claim 12, wherein querying the database relating the supported applications to capabilities of the computing device comprises sending a request indicating the capability to a remote server and receiving requisite device support.

17. A system for extending capabilities of a computing device communicatively coupled to the Internet and capable of executing a plurality of supported applications responsive to user inputs, the system comprising:
   one or more computers configured to perform operations including:
      maintaining a skills database of the capabilities;
      automatically browsing resources identified by universal resource locators (URLs); and
      for each of the URLs,
         parsing the resource identified by the URL for form-based user-interface elements seeking user input;
         creating skill information eliciting the user input;
         associating the skill information with the URL; and
         adding the skill information to the skills database.

* * * * *